March 13, 1973  E. G. PODOLAN  3,720,440
VEHICLE BODY RETRACTABLE TOP
Filed Nov. 26, 1971  3 Sheets-Sheet 2
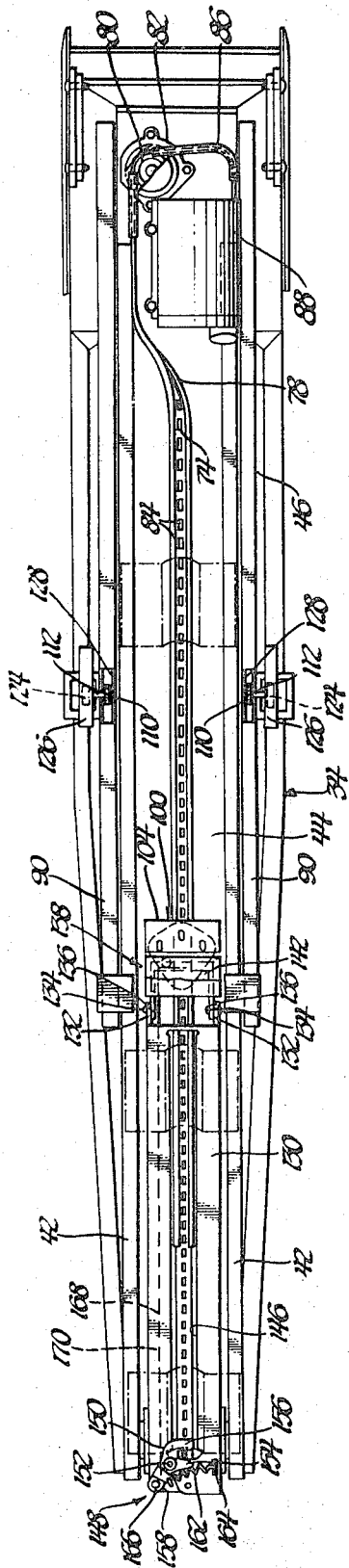
INVENTOR.
Edward G. Podolan
BY
Herbert Furman
ATTORNEY March 13, 1973  E. G. PODOLAN  3,720,440
VEHICLE BODY RETRACTABLE TOP
Filed Nov. 26, 1971  3 Sheets-Sheet 3

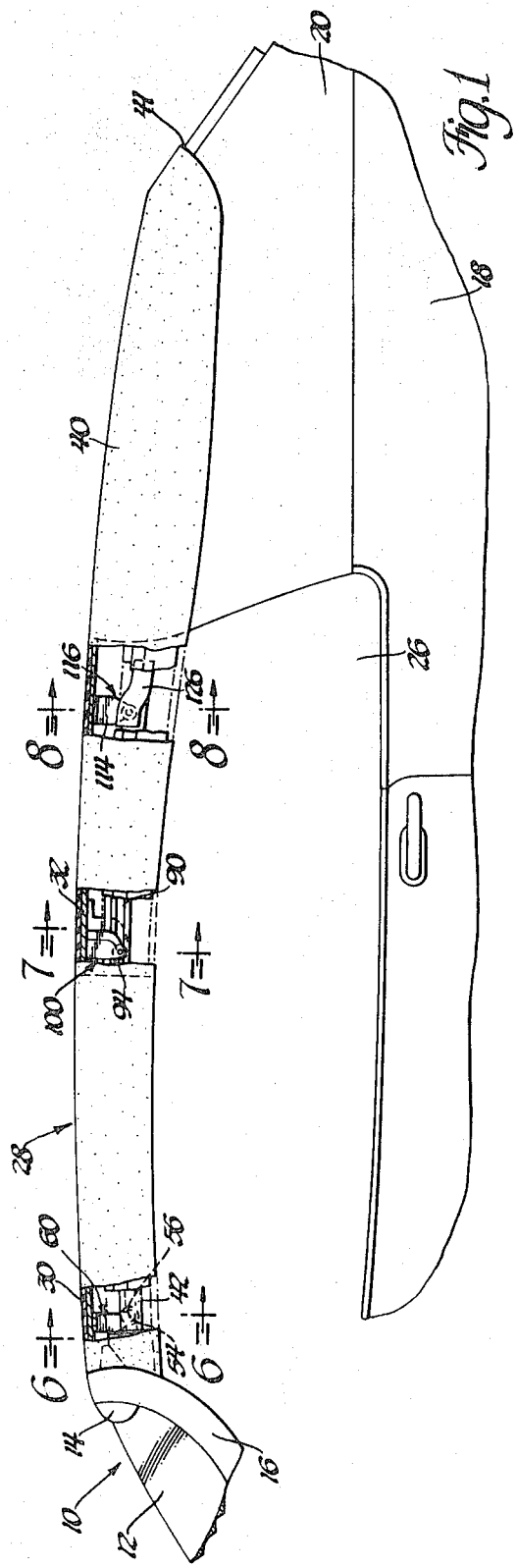

INVENTOR.
Edward G. Podolan
BY
Herbert Furman
ATTORNEY

United States Patent Office 3,720,440
Patented Mar. 13, 1973

3,720,440
VEHICLE BODY RETRACTABLE TOP
Edward G. Podolan, Utica, Mich., assignor to General Motors Corporation, Detroit, Mich.
Filed Nov. 26, 1971, Ser. No. 202,259
Int. Cl. B60j 7/10
U.S. Cl. 296—137 B
7 Claims

ABSTRACT OF THE DISCLOSURE

A vehicle body retractable top includes front and rear movable roof panels supporting respective rollers. A strut extends between the vehicle body windshield header and a fixed roof panel that cooperatively define a roof opening. Channel members supported by the strut receive the rollers to mount the front and rear panels. A drive mechanism translates the front panel between a forward raised position engaging the windshield header and a rearward storage position below the fixed roof panel. A latch mechanism selectively connects the rear panel to the drive mechanism for translatory movement between a rearward storage position below the stored front panel and a forward raised position extending between the fixed panel and the raised front panel. A sheet of flexible material has one edge secured to the fixed panel and the opposite edge secured to the front panel such that the sheet covers and seals the junctures between the panels when the front and rear panels are in raised position. The sheet of flexible material assumes a generally out-of-sight folded position between the fixed panel and stored front panel. Control rollers engage control channel members and cam the rearward end of the rear panel upward into the plane of the fixed panel such that the roof surface is continuous when the front and rear panels are in raised position.

BACKGROUND OF THE INVENTION

This invention relates generally to vehicle body retractable tops and, more particularly, to vehicle body retractable tops including movable roof panels that translate between storage and raised positions.

The United States patent application of Podolan et al. Ser. No. 180,409, filed on Sept. 14, 1971 and assigned to the assignee of the present invention, discloses a vehicle body retractable top having movable front and rear roof panels mounted for generally translatory movement between a forward raised position closing a roof opening and a rearward storage position generally below a fixed roof panel rearward of the roof opening. The upper surfaces of the front and rear roof panels of this top are visible to a person viewing the vehicle body and, consequently, these roof panels must be maintained in spaced relationship relative to each other while in the storage position and during movement to and from the raised position or else scraping of the panels will ruin the aesthetically appealing appearance of the vehicle body. A linkage mechanism of this top interconnects the front and rear roof panels and assumes a released position to maintain the panels in the spaced relationship required. The linkage mechanism moves to an overcenter locked position to shift the panels into sealing engagement in the raised position of the top. To provide the required spaced relationship of the panels during movement between storage and raised positions while concomitantly providing the required sealing between the panels in the raised position, this linkage mechanism and a control linkage controlling its movement are necessarily somewhat complex. Also, the spaced relationship between the front and rear roof panels in the storage position reduces the usable space of the rearward portion of the occupant compartment generally below the fixed roof panel of the vehicle body.

SUMMARY OF THE INVENTION

This invention provides a vehicle body retractable top in which a sheet of flexible material covers and seals the roof panel junctures in a raised position of the top such that the roof panels do not have to be maintained in a spaced relationship during movement to or from and while in the rearwardly translated storage position.

One feature of this invention is that the vehicle body retractable top includes a plurality of movable roof panels mounted for generally translational movement between a rearward storage position below a fixed roof panel and a forward raised position generally closing a roof opening and with a sheet of flexible material extending between the fixed roof panel and the forwardmost movable roof panel to cover the roof panels and their junctures. Another feature of the invention is that the retractable top includes movable front and rear roof panels respectively closing the front and rear portions of the roof opening in raised position and the rear roof panel is positioned below the front roof panel in storage position where the sheet of flexible material assumes a generally out-of-sight folded position between the front roof panel and the fixed roof panel. Another feature of the invention is that a strut extends longitudinally of the vehicle body generally laterally intermediate the sides of the roof opening and supports first and second channel members respectively receiving rollers mounted on the front and rear roof panels to support these roof panels for the translatory movement between the raised and storage positions. Another feature of the invention is that a drive mechanism is connected to the front panel to move this panel between the raised and storage positions and a latch mechanism connects the rear panel to the drive mechanism when the front panel is forward of the rear panel such that the front and rear panels approach raised position moving as a unit. Another feature of the invention is that the latch mechanism includes a latch member fixed relative to the rear panel, spring biased to an unlatched position, and movable to a latched position by a forwardly moving striker portion of the drive mechanism. Another feature of the invention is that a control portion of the latch member engages the lateral side of a control member when the rear panel is forward of storage position to maintain the latch member in latched position and the connection between the rear panel and drive mechanism, while the control portion of the latch member moves over the rear end of the control member under the spring bias as the rear panel reaches storage position to disconnect the rear panel and drive mechanism. Another feature of the invention is that the rear panel includes a roller received within a control channel member to cam the rearward edge of the rear panel upwardly into the plane of the fixed panel such that the roof surface is continuous with the front and rear panels in raised position.

BRIEF DESCRIPTION OF THE DRAWINGS

An understanding of the present invention is readily apparent from the following description of the preferred embodiment and the drawings in which:

FIG. 1 is a partially broken away side view of a vehicle body including a retractable top according to this invention shown in a forward raised position closing a roof opening;

FIG. 2 is a partially sectioned view similar to FIG. 1 showing the top in a rearward storage position where movable front and rear roof panels are located below a fixed roof panel to the rear of the roof opening;

FIG. 3 is an enlarged top plan view taken generally along line 3—3 of FIG. 2 and showing a strut that extends between the vehicle body windshield header and the fixed roof panel intermediate the lateral sides of the roof opening, with a top trim panel of the strut removed to show first and second pairs of channel members that respectively receive rollers mounted on the front and rear panels and a drive mechanism for translating these panels between the raised and storage positions;

FIG. 4 is an enlarged view of the forward end of a longitudinally extending connecting member whose rearward end is secured to the rear roof panel, and shows a latch member on the forward end of the connecting member in a latched position engaging a striker portion of the drive mechanism which is also connected to the front panel such that the front and rear panels move as a unit when the front panel is forward of the rear panel;

FIG. 5 is a view similar to FIG. 4 showing the connecting member and latch member when the rear panel is in the storage position where a control pin of the latch member has moved over the rear end of a control member under a spring bias as the latch member moves to an unlatched position and releases the rear panel from the drive mechanism to allow front panel movement to storage position independently of the rear panel;

DESCRIPTION OF THE PREFERRED EMBODIMENT

Figure 6:
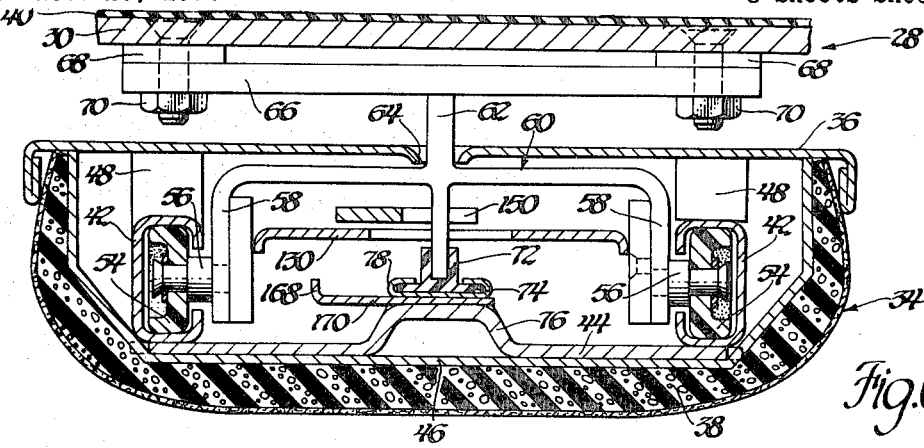
FIG. 6 is an enlarged sectional view taken along line 6—6 of FIG. 1 and showing the pair of first channel members supporting the front panel and the connection between the drive mechanism and the front panel.

Referring to FIGS. 1 and 2 of the drawings, a vehicle body generally indicated by 10 includes a conventional windshield 12 bounded by the usual windshield header 14 and windshield pillars 16. The rear quarter panel 18 of the vehicle body supports the sail panel 20 in the usual manner and a fixed roof panel 22 supported by the upper end of the sail panel extends laterally of the vehicle body. The windshield header 14 and the fixed roof panel 22 cooperate to define a roof opening 24, FIG. 2, to the vehicle occupant compartment 26.

A retractable top, according to this invention, is generally indicated by 28 and includes movable front and rear roof panels 30 and 32 shown in a forward raised position in FIG. 1 closing the roof opening 24 and in a rearward storage position in FIG. 2 generally below the fixed roof panel 22. As best seen in FIG. 2, a strut 34 extends longitudinally of the vehicle body between the windshield header 14 and the lower side of fixed roof panel 22 generally intermediate the lateral sides of the roof opening 24. The strut 34 includes a top trim panel 36 and lower trim padding 38. The front and rear panels 30 and 32 are supported by strut 34 for translatory movement between the raised and storage positions in a manner to be described. A sheet of generally flexible material, such as rubber or vinyl, is indicated by 40 and has a rear edge 41 suitably secured to the fixed roof panel 22. The forward portion of sheet 40 is suitably secured to the upper surface of front panel 30, as by adhesive bonding. When the front and rear panels 30 and 32 are in the FIG. 1 raised position, the sheet of flexible material 40 covers the roof panels and seals the roof panel junctures. The sheet of flexible material 40 moves to a generally out-of-sight folded position as the front and rear panels 30 and 32 move to the FIG. 2 storage position. Since the front and rear panels 30 and 32 are not visible to an individual observing the vehicle body, there is no necessity to maintain these roof panels in spaced relationship to prevent scraping of the panels during movement between the raised and storage positions. Consequently, the reduction in usable space adjacent the rear end of occupant compartment 26 when retractable top 28 is in storage position is minimized.

Referring to FIG. 3 and FIGS. 6 through 8, a first pair of channel members 42 extend longitudinally of the vehicle body within strut 34 and open inwardly in opposed relationship. Adjacent the forward end of the strut 34, FIG. 6, the bottom walls of channel members 42 seat against a mounting plate 44 received within a generally U-shaped upwardly opening support plate 46 of the strut. Spacers 48 support the trim panel 36 on the top walls of channel members 42 adjacent the forward end of the strut while similar spacers 50 position the channel members 42 intermediate the trim panel 36 and mounting plate 44 for the rearward portions of channel members 42, FIGS. 7 and 8. The spacers 48 and 50 may be welded to the channel members 42 while attached to the trim panel 36 and mounting plate 44 by longitudinally spaced screws, such as screw 52 shown in FIG. 7. As seen in FIG. 6, the channel members 42 receive respective rollers 54 rotatably supported by pins 56 on downwardly extending legs 58 of a support arrangement generally indicated by 60. A vertically extending leg 62 of support arrangement 60 extends through a longitudinally extending slot 64 in trim panel 36 and has its upper end supported by a plate 66 secured to the forward edge of front panel 30 in spaced relationship by spacers 68 and nut and bolt arrangements 70. The lower end of leg 62 is received by an embossment 72 at the forward end of a generally flexible apertured drive tape 74. The drive tape 74 is supported adjacent the upper side of an embossment 76 in mounting plate 44 by way of a channel member 78 that extends longitudinally of the strut 36 as best shown in FIG. 3. At the rear end of strut 34, channel member 78 is twisted 90 degrees such that a driving gear 80 connected to a suitable electric motor 82 is capable of engaging the drive tape apertures 84 to slide the drive tape within the channel member 78. The support arrangement 60 moves the front panel 30 between the FIG. 1 raised position and FIG. 2 storage position as the drive tape 74 slides within channel member 78. A guide channel member 86 adjacent motor 82 guides the drive tape 74 for storage within a storage unit 88.

Figure 7:
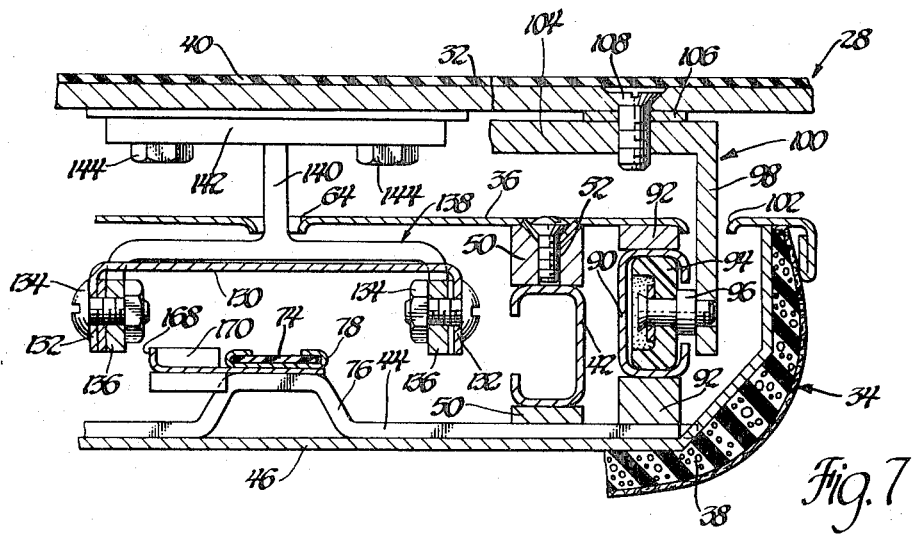
FIG. 7 is an enlarged sectional view taken along line 7—7 of FIG. 1 and showing the mounting of the forward end of the rear panel.
Figure 8:
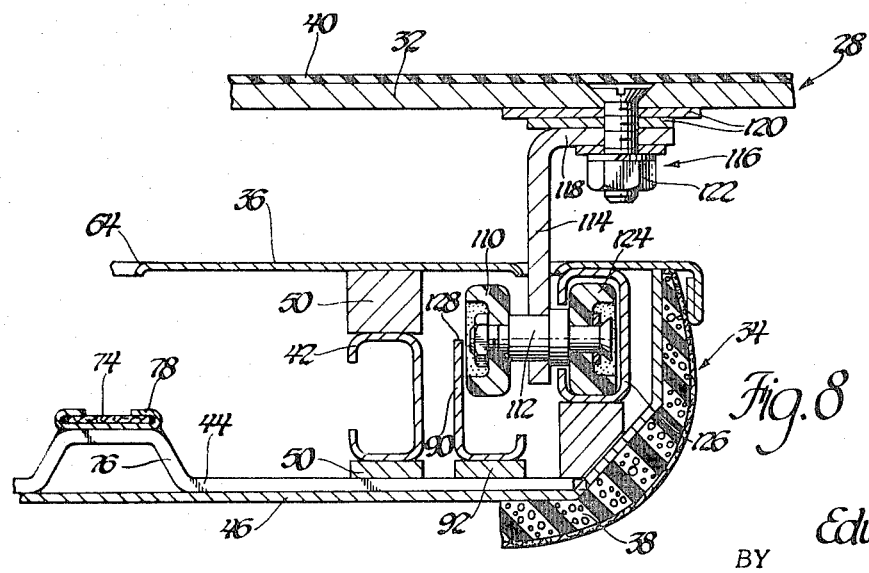
FIG. 8 is an enlarged sectional view taken along line 8—8 of FIG. 1 and showing the mounting of the rearward end of the rear panel.

Referring to FIGS. 3 and FIGS. 7 and 8, a second pair of channel members 90 open outwardly and extend longitudinally of strut 34 for approximately the rearward two-thirds of the strut length. The channel members 90 are supported between mounting plate 44 and trim panel 36 by spacers 92 in a manner similar to the manner in which spacers 48 and 50 support channel members 42 relative to the strut. Adjacent the forward end of rear panel 32 as seen in FIGS. 1 and 7, the channel members 90 receive rollers 94 rotatably supported by pins 96 on the lower ends of downwardly extending legs 98 of a support arrangement generally indicated by 100. Legs 98 are received in respective outboard longitudinally extending slots 102 in trim panel 36 and have their upper ends integrally connected to a plate 104 secured to rear panel 32 in spaced relationship by spacers 106 and screws 108 to thus support the forward end of the rear panel relative to strut 34.

Adjacent the rearward end of rear panel 32, rollers 110, FIG. 8, normally received by channel members 90 are rotatable on pins 112 at the lower ends of legs 114 of a support arrangement generally indicated by 116. The upper ends of legs 114 have laterally extending flanges 118 secured to rear panel 32 by spacers 120 and nut and bolt arrangement 122. Just prior to the forwardly moving rear panel 32 reaching the FIG. 1 raised position, rollers 124 rotatably supported on the outboard ends of pins 112 are received by control channel members 126, see FIGS. 1 through 3 also, to cam the rearward end of rear panel 32 upwardly, as will be later described, while the rollers 110 move upwardly out of channel members 90 through cutaway portions 128, FIGS. 3 and 8.

Referring to FIGS. 3 through 7, a connecting plate 130 extends longitudinally of strut 34 between channel members 42. The rear end of connecting plate 130 includes legs 132 pivoted by nut and bolt arrangements 134, FIG. 7, to forwardly extending legs 136 of a bifurcated member 138, FIGS. 3 and 7. Members 138 includes a vertically extending portion 140 received within the slot 64 in trim panel 36. Above trim panel 36, the vertically extending portion 140 has its upper end integrally connected to a plate 142 secured to the forward end of rear roof panel 32 by bolts 144. The connecting plate 130 includes a longitudinally extending slot 146 best seen in FIG. 3. As best seen in FIGS. 3 through 5, the connecting plate 130 supports a latch mechanism 148 adjacent the forward end of slot 146. A bolt 150 of latch mechanism 148 is pivoted to connecting plate 130 by a pin 152 and includes leading and lagging latching legs 154 and 156. On the opposite side of pin 152 from the latching legs, the bolt includes a leg 158 having an apertured flange 160 attaching one end of a helical spring 162 whose other end is attached to a flange 164 on the connecting plate 130. Spring 162 normally biases bolt 150 counterclockwise about pin 152 to the unlatched position of FIG. 5 where the vertically extending leg 62 connected to drive tape 74 and front roof panel 30 is free of the latching legs 154 and 156 to allow rearward movement of the front panel 30 independently of the rear panel 32. Forward movement of the front panel 30 moves leg 62 from the FIG. 5 position into engagement with the leading latching leg 154, pivoting the bolt 150 clockwise about pin 152 to the FIG. 4 latched position where the latching legs capture leg 62 and thus interconnect the panels for movement as a unit.

The leg 158 of bolt 150 supports a control pin 166 that engages a lateral edge 168 of a control member 170, as in FIG. 4, to prevent pivoting of the bolt 150 to unlatched position when the rear panel 32 is forward of the storage position. As seen in FIGS. 6 and 7, the control member 170 is fixedly secured in a suitable manner between the channel member 78 carrying drive tape 74 and the embossment 76 of mounting plate 44. During the movement of the bolt from the FIG. 5 unlatched position to the FIG. 4 latched position, the control pin 166 moves laterally of the rear end of control member 170 into sliding engagement with edge 168. When the rear roof panel 32 moves to storage position, the spring bias of the bolt 150 moves to control pin 166 over the rear end of control member 170 as the bolt moves to unlatched position.

When the front and rear panels 30 and 32 are in the rearward storage position of FIG. 2, actuation of a suitable electric circuit energizes the motor 82 in a forward driving direction to move the forward end of drive tape 74 from the rear end of slot 146 in connecting plate 130 forwardly toward the bolt 150 as the front panel 30 is moved forwardly sliding over the top surface of the stationary rear panel 32. When the rearward edge of front panel 30 moves into engagement with a support flange 172 on the forward edge of rear panel 32, see flange 172 in FIG. 2, the leg 62 of support arrangement 60 conecting the drive tape to the front panel engages the leading latch leg 154 of bolt 150 and pivots the bolt clockwise to the latched position where the latching legs 154 and 156 secure the leg 62 and through the connecting plate 130 connect the rear panel 32 for movement with the front panel 30 as a unit toward the raised position. The control pin 166 moves over the rear end of control member 170 to maintain the bolt 150 in the latched position against the bias of spring 162 until the rear panel 32 is returned to storage position. The continued forward movement of front panel 30 from the stored position toward the raised position pulls the sheet of flexible material 40 forwardly from the generally out-of-sight folded position shown in FIG. 2. Just prior to the front and rear panels 30 and 32 reaching the raised position of FIG. 1, the rollers 124 of support arrangement 116 are received within the control channel members 126 and move the rear edge of the rear panel 32 upwardly into the plane of the fixed roof panel 22 as the forward edge of the front panel 30 engages the windshield header 14. Suitable windshield header latch mechanisms, not shown, maintain the front and rear panels in raised position where the sheet of flexible material 40 stretches over the roof panels and seals the roof panel junctures.

Unlatching of the windshield header latch mechanisms and actuation of the electric circuit to energize motor 82 in a rearward driving direction moves the interlocked front and rear roof panels 30 and 32 rearwardly as control pin 166 slides rearwardly along edge 168 of control member 170. When the rear panel 32 reaches the storage position of FIG. 2, the control pin 166 moves over the rear end of control member 170 to allow the bias of spring 162 to move the bolt 150 to the FIG. 5 unlatched position where leg 162 is free of the bolt such that front panel 30 can continue moving rearwardly to storage position. During movement of the front panel 30 to the storage position, the adhesion of the forward portion of the sheet of flexible material 40 to the front panel folds the sheet in the out-of-sight position of FIG. 2.

Although it is not shown by the drawings, it is also possible to provide the lateral rear edges of the rear panel 32 with suitable guide rails slidable along tracks mounted on the vehicle body sail panels 20 to further guide the movement of the rear panel between the raised and storage positions.

The invention thus provides an improved vehicle body retractable top.

What is claimed is:

1. In combination with a vehicle body having a roof opening and a fixed roof panel rearward thereof, a retractable top for selectively closing the roof opening comprising: a plurality of movable roof panels; means mounting the movable roof panels on the vehicle body for generally translatory movement between a stacked rearward storage position generally below the fixed roof panel and a forward end-to-end raised position generally closing the roof opening; and a sheet of flexible material with one edge secured to the fixed roof panel and the opposite edge secured to the forwardmost movable roof panel such that the sheet covers and seals the junctures between the roof panels when the movable roof panels are in raised position, the sheet of flexible material assuming a generally out-of-sight folded position below the fixed roof panel during rearward movement of the movable roof panels from the raised position to the storage position.

2. In combination with a vehicle body having a roof opening and a fixed roof panel rearward thereof, a retractable top for selectively closing the roof opening comprising: movable front and rear roof panels; first means mounting the front roof panel for generally translatory movement between a rearward storage position generally below the fixed roof panel and a forward raised position closing a forward portion of the roof opening; second means mounting the rear roof panel for generally translatory movement between a rearward storage position generally below the stored front roof panel and a forward raised position generally closing the portion of the roof opening rearward of the raised front roof panel; and a sheet of flexible material with one edge secured to the fixed roof panel and the opposite edge secured to the front roof panel such that the sheet covers and seals the junctures between the roof panels when the front and rear roof panels are in raised position, the sheet of flexible material assuming a generally out-of-sight folded position between the fixed roof panel and the front roof panel during rearward movement of the front panel from raised position to the storage position.

3. The combination of claim 2 including latch means interconnecting the front and rear roof panels for movement as a unit when the rear edge of the forwardly moving front roof panel moves into proximity with the forward edge of the stored rear panel, the latch means disconnecting the rearwardly moving front and rear roof panels when the rearwardly moving rear roof panel reaches stoage position to allow continued rearward movement of the front roof panel to storage position and movement of the sheet of flexible material to the generally out-of-sight folded position.

4. In combination with a vehicle body having a roof opening and a fixed roof panel rearward thereof, a retractable top for selectively closing the roof opening comprising: movable front and rear roof panels including respective downwardly extending roller means; strut means extending between the fixed roof panel and the forward end of the roof opening generally intermediate the lateral sides of the roof opening; first and second channel means supported by the strut means and respectively receiving the roller means of the front and rear roof panels to mount these roof panels for generally translatory movement between a rearward storage position where the front roof panel is generally below the fixed roof panel and above the rear roof panel and a forward raised position where the front and rear roof panels generally close the roof opening; a sheet of generally flexible material with one edge secured to the fixed roof panel and the opposite edge secured to the front panel such that the sheet covers and seals the junctures between the roof panels when the front and rear roof panels are in raised position, the sheet of flexible material assuming a generally out-of-sight folded position during rearward movement of the front and rear roof panels from raised position to storage position; drive means connected to the forward edge of the front roof panel and selectively actuatable to move this panel between raised position and storage position; and latch means for connecting the rear roof panel to the drive means as the rear edge of the forwardly moving front roof panel moves into proximity with the front edge of the rear roof panel such that the front and rear roof panels move as a unit while approaching the raised position, the latch means disconnecting the rear roof panel from the drive means when the rearwardly moving rear roof panel reaches storage position to allow continued rearward movement of the front roof panel to storage position and movement of the sheet of flexible material to the generally out-of-sight folded position.

5. The combination of claim 4 wherein the roller means of the rear roof panel includes front and rear components and the rear component includes a portion engageable with control channel means to lift the rear edge of the rear roof panel into the plane of the fixed roof panel upon reaching the raised position as the rear component of the roller means moves through an upwardly cutaway portion of the second channel means.

6. The combination of claim 4 wherein the latch means includes a latch member spring biased to an unlatched position where the rear panel is disconnected from the drive means and movable to a latched position in engagement with a keeper portion of the drive means upon forward movement of the keeper portion into engagement with the latch member.

7. The combination of claim 6 wherein the latch member includes a control portion engageable with a longitudinally extending edge of a control member when the rear roof panel is forward of storage position to maintain the latch member in latched position against the spring bias, the control portion moving over the rear end of the control member upon rearward movement of the rear roof panel to storage position to allow movement of the latch member to unlatched position and disconnection of the rear roof panel from the drive means.

References Cited
UNITED STATES PATENTS

| | | | |
|---|---|---|---|
| 2,997,336 | 8/1961 | Huggins | 296—137 E |
| 2,215,022 | 9/1940 | Votypka | 296—137 E |
| 2,122,712 | 7/1938 | Bishop | 296—137 E |
| 3,348,877 | 10/1967 | Caramanna | 296—137 R |

BENJAMIN HERSH, Primary Examiner

R. R. SONG, Assistant Examiner